United States Patent
Hill et al.

(10) Patent No.: US 9,432,710 B2
(45) Date of Patent: Aug. 30, 2016

(54) METHODS SYSTEMS, AND PRODUCTS FOR CONSERVING BANDWIDTH

(75) Inventors: Peter N. Hill, Atlanta, GA (US); Timothy H. Weaver, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1623 days.

(21) Appl. No.: 11/703,573

(22) Filed: Feb. 7, 2007

(65) Prior Publication Data

US 2007/0294717 A1     Dec. 20, 2007

Related U.S. Application Data

(60) Provisional application No. 60/813,400, filed on Jun. 14, 2006.

(51) Int. Cl.
| | |
|---|---|
| H04N 21/262 | (2011.01) |
| H04N 7/173 | (2011.01) |
| H04N 21/24 | (2011.01) |
| H04N 21/472 | (2011.01) |

(52) U.S. Cl.
CPC .... *H04N 21/26216* (2013.01); *H04N 7/17318* (2013.01); *H04N 21/2402* (2013.01); *H04N 21/2625* (2013.01); *H04N 21/47202* (2013.01)

(58) Field of Classification Search
USPC .......... 370/234, 235, 328, 390, 394, 395.42; 375/240.1; 455/450; 705/1; 709/201, 709/232, 233; 715/835; 717/170; 725/91, 725/95, 114, 115, 133
See application file for complete search history.

(56) References Cited

U.S. PATENT DOCUMENTS

| | | |
|---|---|---|
| 4,903,130 A | 2/1990 | Kitagawa et al. |
| 5,255,180 A | 10/1993 | Shinoda et al. |
| 5,313,282 A | 5/1994 | Hayashi |
| 5,331,354 A | 7/1994 | Koyama et al. |
| 5,652,615 A | 7/1997 | Bryant et al. |
| 5,731,764 A | 3/1998 | Tanaka |
| 5,774,170 A | 6/1998 | Hite |
| 6,006,257 A | 12/1999 | Slezak |
| 6,009,409 A | 12/1999 | Adler et al. |
| 6,078,589 A | 6/2000 | Kuechler |
| 6,237,022 B1 | 5/2001 | Bruck |
| 6,252,588 B1 | 6/2001 | Dawson |
| 6,307,550 B1 | 10/2001 | Chen |
| 6,317,165 B1 | 11/2001 | Balram |
| 6,324,182 B1 | 11/2001 | Burns |
| 6,345,293 B1 | 2/2002 | Chaddha |
| 6,446,261 B1 | 9/2002 | Rosser |
| 6,460,075 B2 | 10/2002 | Krueger |
| 6,591,423 B1 | 7/2003 | Campbell |
| 6,647,411 B2 | 11/2003 | Towell |
| 6,698,020 B1 | 2/2004 | Zigmond et al. |
| 6,757,796 B1 | 6/2004 | Hofmann |
| 6,771,644 B1 | 8/2004 | Brassil et al. |
| 6,791,622 B2 | 9/2004 | Zeidler |
| 6,870,463 B2 | 3/2005 | Dresti et al. |

(Continued)

*Primary Examiner* — Joseph Bednash
(74) *Attorney, Agent, or Firm* — Cantor Colburn LLP

(57) ABSTRACT

Methods, systems, and products are disclosed for conserving bandwidth. A notification is received from a customer's device that indicates media will be recorded/saved to memory. The available bandwidth is compared to required bandwidth to deliver the media to the customer's device. When the required bandwidth exceeds the available bandwidth, then delivery of the media is deferred to a period of lesser demand.

16 Claims, 6 Drawing Sheets

(56) References Cited

U.S. PATENT DOCUMENTS

| | | | |
|---|---|---|---|
| 6,882,793 B1 | 4/2005 | Fu | |
| 6,963,903 B2 | 11/2005 | Krueger | |
| 7,584,497 B2* | 9/2009 | Potrebic et al. | 725/116 |
| 2002/0028026 A1 | 3/2002 | Chen | |
| 2002/0108127 A1 | 8/2002 | Lew | |
| 2002/0112005 A1 | 8/2002 | Namias | |
| 2002/0133830 A1 | 9/2002 | Kim | |
| 2002/0161913 A1* | 10/2002 | Gonzalez et al. | 709/233 |
| 2003/0067554 A1 | 4/2003 | Klarfeld | |
| 2003/0088687 A1 | 5/2003 | Begeja | |
| 2003/0088878 A1 | 5/2003 | Rogers | |
| 2003/0139134 A1 | 7/2003 | Bailey et al. | |
| 2004/0031058 A1 | 2/2004 | Reisman | |
| 2004/0078814 A1 | 4/2004 | Allen | |
| 2004/0131357 A1 | 7/2004 | Farmer et al. | |
| 2004/0210944 A1 | 10/2004 | Brassil et al. | |
| 2004/0255336 A1 | 12/2004 | Logan | |
| 2004/0268407 A1 | 12/2004 | Sparrell et al. | |
| 2004/0268410 A1 | 12/2004 | Barton | |
| 2005/0081252 A1 | 4/2005 | Chefalas | |
| 2006/0029093 A1 | 2/2006 | Van Rossum | |
| 2006/0037047 A1* | 2/2006 | DeYonker et al. | 725/58 |
| 2006/0268099 A1* | 11/2006 | Potrebic et al. | 348/14.01 |

* cited by examiner

METHODS SYSTEMS, AND PRODUCTS FOR CONSERVING BANDWIDTH

CROSS-REFERENCE TO RELATED APPLICATIONS

This application claims the benefit of U.S. Provisional Application No. 60/813,400, filed Jun. 4, 2006, and incorporated herein by reference in its entirety.

This application also relates to the following co-pending and commonly-assigned applications, with each application incorporated herein by reference: U.S. application Ser. No. 11/300,125, filed Dec. 14, 2005 and entitled "Presence Detection in a Bandwidth Management System"; U.S. application Ser. No. 11/300,061, filed Dec. 14, 2005 and entitled "Methods, Systems, and Devices for Bandwidth Conservation"; U.S. application Ser. No. 11/178,075, filed Jul. 8, 2005 and entitled "Methods, Systems, and Devices for Securing Content"; U.S. application Ser. No. 11/304,264, filed Dec. 14, 2005 and entitled "Methods, Systems, and Computer Program Products For Providing Traffic Control Services"; U.S. application Ser. No. 11/703,352 concurrently filed and entitled "Methods and Systems for Image Processing"; U.S. application Ser. No. 11/703,359, concurrently filed and entitled "Methods, Systems, and Products for Recording Media"; U.S. application Ser. No. 11/703,574, concurrently filed and entitled "Methods, Systems, and Products for Recording Media"; U.S. application Ser. No. 11/703,325, concurrently filed and entitled "Methods, Systems, and Products for Targeting Media"; and U.S. application Ser. No. 11/703,565, concurrently filed and entitled "Methods, Systems, and Products for Restoring Media".

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to conservation of bandwidth in such systems to avoid service degradation during peak periods of demand.

Distribution network bandwidth is becoming a problem in the communications industry. As subscribers demand more and more content, higher definition services, interactive services, and data services, the amount of bandwidth required to meet demand continues to increase. While most portions of networks may have ample bandwidth, the "last mile," however, is often a bandwidth bottleneck. Service providers, then, are always striving to meet customer needs while efficiently utilizing available bandwidth.

Recording of content streams for later viewing during periods of high bandwidth demand is one example of inefficient bandwidth usage. Because programmers often present their very best programming at the same time, there is a high probability that a consumer will choose to watch one program while simultaneously recording another program for later viewing. The bandwidth demand created by this consumer behavior is particularly significant when the programs being viewed and recorded are offered in High Definition (HD) formats. The HD format may require four times as much bandwidth as Standard Definition (SD) programming. Because the amount of programming in HD format is increasing, and because the number of devices capable of viewing and recording HD programming is also increasing, there is a need in the art for reducing the bandwidth that is consumed by recording devices during peak viewing periods.

SUMMARY

The aforementioned problems, and other problems, are addressed, according to exemplary embodiments, by methods, systems, and devices that conserve bandwidth in communications networks. When media is being recorded, or when media is scheduled for recording, exemplary embodiments may defer the delivery of that media content to a later time and/or date if a customer is not immediately viewing or otherwise experiencing the media, and the demand for bandwidth is high (such as during evening prime time hours). Exemplary embodiments, then, detect when media content is being recorded or is scheduled for recording. When such recording is detected, exemplary embodiments may defer delivery of the media to periods of lesser demand (such as early morning hours). By deferring the delivery and recording of media, the amount of bandwidth required to meet customer needs during peak periods is substantially reduced.

Additional exemplary embodiments may store programming in a network storage device. Because the customer's media content may be rescheduled for an alternative time of delivery and receipt, a service or network provider may store that programming and/or content for later delivery. High definition programming, for example, may be stored in network servers for deferred delivery at later times. A service or network provider may then receive, store, and/or maintain electronic copies of the HD streams, such that the streams may be retrieved and delivered at other times.

Exemplary embodiments may also compare bandwidths. Exemplary embodiments may compare the available bandwidth to the bandwidth that is required to deliver a user's, customer's, or subscriber's requested content. Exemplary embodiments, for example, may determine the bandwidth available along a "last mile" serving a residence or business. The last mile (such as a DSL or other copper line, coaxial cable, or fiber line) is sometimes a bandwidth bottleneck. Exemplary embodiments, however, may determine, or be informed of, the available bandwidth along any link in a communications network. This available bandwidth is compared to the bandwidth required to satisfy one or more content requests. When the available bandwidth is less than the bandwidth required to meet content demand, and some of that demand or requested content is or will be recorded, exemplary embodiments may reschedule the delivery of recorded streams. Exemplary embodiments detect or determine recording by any communications device, whether that device "stands alone" or operates in a networked environment. So, if a stream of media or data is being recorded, or will be recorded, by any networked communications device, and/or when the required bandwidth exceeds available bandwidth, exemplary embodiments may reschedule the delivery of recorded streams.

Exemplary embodiments may also permit customer resolution of bandwidth issues. When the required bandwidth exceeds the available bandwidth, the customer may be prompted to resolve the conflict. The customer, for example, may be notified that the bandwidth required to deliver their requested media exceeds the available bandwidth along any link in the communications network. The customer may be given the opportunity to cancel their request and, instead, choose a lesser bandwidth-intensive content (perhaps a standard definition version). If some of the customer's content selection is being recorded, or will be recorded, the customer may also be prompted to reschedule that delivery and recording during a less bandwidth-intensive period of time.

Exemplary embodiments may also select alternative methods of delivery. When the required bandwidth exceeds the available bandwidth, exemplary embodiments may establish alternative delivery schedules and/or delivery means for content. These alternative delivery schedules and or delivery means more efficiently utilize the available network bandwidth. Exemplary embodiments, as mentioned above, may defer delivery to later times. Exemplary embodiments, however, may additionally or alternatively change the technical approach for the delivery of content. An alternative delivery method may be selected to more efficiently utilize bandwidth, while still satisfying the customer's needs. Reduced bit rates, for example, may be used to conserve bandwidth. When bandwidth is a concern, a movie could be streamed at one quarter rate. Moreover, as later paragraphs will explain, unicast or multicast streaming techniques, at full-speed or at slower rates, may be used to more efficiently utilize bandwidth. Exemplary embodiments, then, may implement alternative methods of delivery that further efficiently utilize bandwidth.

Methods, systems, and products are disclosed for conserving bandwidth. One such method receives a notification from a customer's device. The notification indicates media will be recorded/saved to memory. The available bandwidth is compared to required bandwidth to deliver the media to the customer's device. When the required bandwidth exceeds the available bandwidth, then delivery of the media is deferred to a period of lesser demand.

More exemplary embodiments disclose a system for conserving bandwidth. The system comprises a processor that communicates with memory. The memory stores processor-executable instructions for receiving a notification from a customer's device that indicates media will be recorded. The available bandwidth is compared to required bandwidth to deliver the media to the customer's device. When the required bandwidth exceeds the available bandwidth, then delivery of the media is deferred to a period of lesser demand.

Still more exemplary embodiments disclose a computer program product for conserving bandwidth. The computer program product stores processor-executable instructions for receiving a notification from a customer's device that indicates media will be recorded. The available bandwidth is compared to required bandwidth to deliver the media to the customer's device. When the required bandwidth exceeds the available bandwidth, then delivery of the media is deferred to a period of lesser demand.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
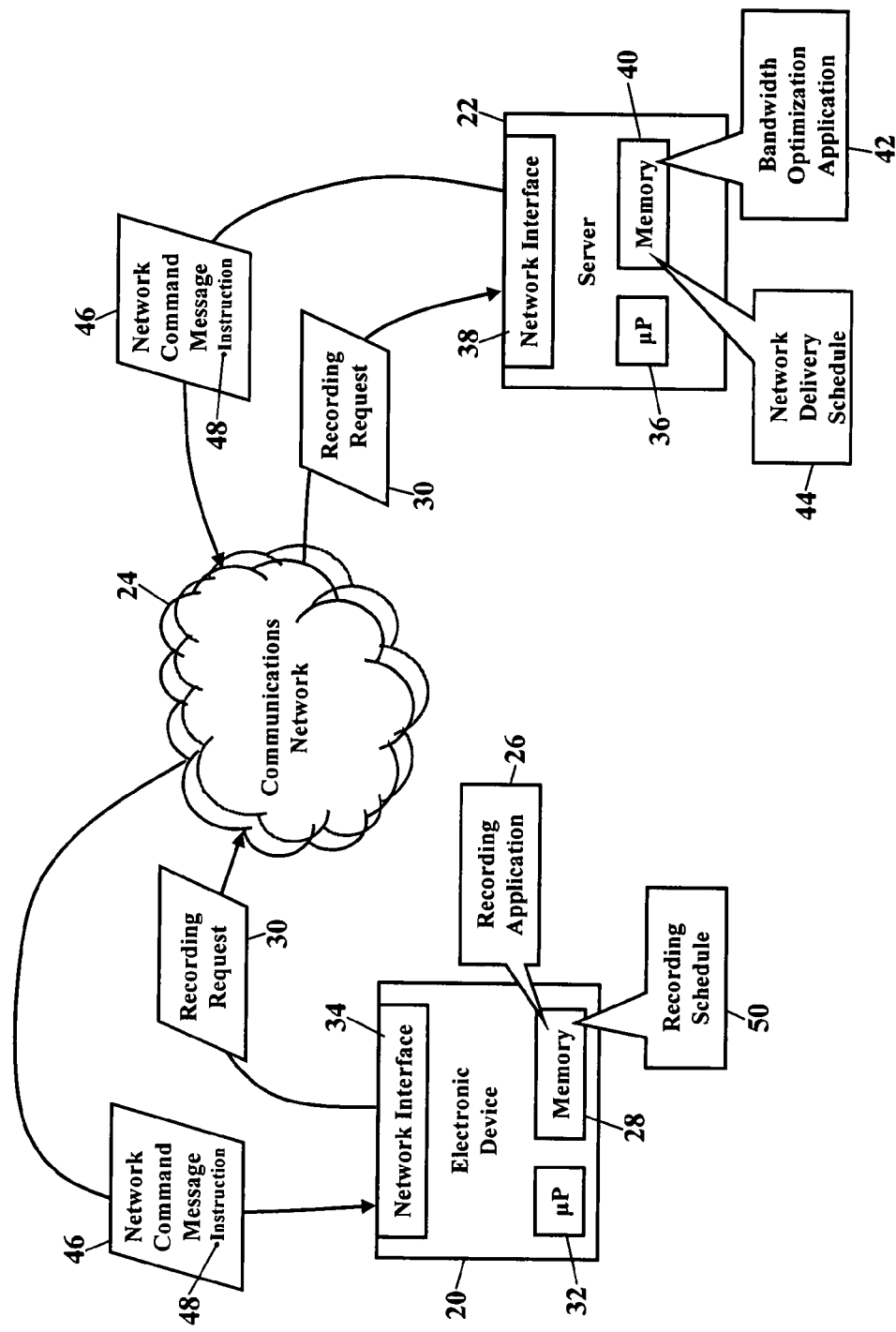
FIG. 1 is a simplified schematic illustrating an operating environment according to exemplary embodiments.

FIG. 1 is a schematic illustrating an operating environment, according to exemplary embodiments. FIG. 1 illustrates a customer's electronic device 20 communicating with a service, network, or content provider's server 22 via a communications network 24. Although the customer's electronic device 20 is generically shown, as later paragraphs will explain, the electronic device 20 may be a computer, set-top box, digital recorder, or any other communications device. The customer's electronic device 20 stores a recording application 26 in memory 28. Whenever the customer schedules the recording of media, the recording application 26 may send a recording request 30 to the server 22. The recording application 26 includes processor-executable code or instructions that cause a processor 32 to invoke a network interface 34 to communicate the recording request 30 to the server 22. The processor 32 thus sends the recording request 30 via the communications network 24 to a communications or network address associated with the server 22.

The server 22 receives the recording request 30. The server 22 has a processor 36 communicating with a network interface 38 and with memory 40. A bandwidth optimization application 42 may be stored in the memory 46 of the server 22. The bandwidth optimization application 42 includes processor-executable code or instructions that cause the processor 36 to receive the recording request 30 via the network interface 38 to the communications network 24. According to exemplary embodiments, the recording request 30 indicates what media is scheduled for recording by the customer's electronic device 20. The provider's server 22 is thus notified of the media selected by the customer for recording.

Deferred delivery may now be implemented to conserve bandwidth. The bandwidth optimization application 42 may inspect the recording request 30 to obtain at least the title of the recorded media and the scheduled time for recording. Suppose, for example, that the recording request 30 indicates a movie is scheduled for recording from 8 PM to 10 PM. If this time slot is a period of high bandwidth demand, the bandwidth optimization application 42 may defer delivery and recording of the movie to a period of lesser demand. The bandwidth optimization application 42, for example, may defer delivery of a stream of media or data, representing the customer's desired movie, until 2 AM (or any other time when bandwidth demand is less). The bandwidth optimization application 42 adds an entry to a network delivery schedule 44. According to exemplary embodiments, the network delivery schedule 44 contains a master schedule of what content media is to be delivered to whom at what time. In this example, then, even though the customer scheduled recording for 8-10 PM, the bandwidth optimization application 42 defers delivery to a later time.

The bandwidth optimization application 42 may also inform the customer's electronic device 20. Because the bandwidth optimization application 42 has deferred delivery to a later time, the customer's electronic device 20 is also instructed to defer recording. According to exemplary embodiments, the bandwidth optimization application 42, then, causes the server 22 to send a network command message 46 to the customer's electronic device 20. The network command message 46 comprises an instruction 48 to alter a recording schedule 50 to the deferred date/time. The network command message 46, however, may additionally or alternative include a nearly instantaneous instruction to record a stream of media or data. That is, a network, service, and/or content provider may instruct the user's electronic device 20 to record media at a date/time selected by the provider. The network command message 46 may identify a date and/or time to begin a recording mode of operation. The network command message 46 may also identify a channel and/or communications address associated with the media selected by the provider. The network command message 46 may further identify the media by title, programming identification, path, link, start/end time, or other identifying information.

The user's electronic device 20 receives the network command message 46. The recording application 26 may instruct the processor 32 to create or to revise an entry in the recording schedule 50. The network command message 46, for example, may create a new entry in the recording schedule 50, and the new entry corresponds to the media the provider wishes to be recorded. The network command message 46, however, may alter an existing entry, such that the media is recorded at an alternate date and/or time selected by the provider. The user's electronic device 20 still records the user's desired media, but the network, service, and/or content provider has judiciously conserved bandwidth by altering the recording schedule 50.

The bandwidth optimization application 42 may be informed of any recording device. A customer, whether residential or business, may have a local network with many networked devices. The recording application 26, then, may inform the bandwidth optimization application 42 of any device that schedules recording of media or that records media. The recording application 26, for example, may have multiple instances installed and operating on multiple, networked devices. The recording application 26, however, may also be a master application that communicates with subordinate or complementary applications operating in the networked device. Exemplary embodiments, then, detect or determine scheduled recording, or a recording mode of operation, by any communications device, whether that device "stands alone" or whether that device operates in a networked environment.

The customer's electronic device 20, and the server 22, are only simply illustrated. Because the architecture and operating principles of computers, communications devices, and other processor-controlled devices are well known, the hardware and software componentry of the customer's electronic device 20 and the server 22 are not further shown and described. If, however, the reader desires more details, the reader is invited to consult the following sources, all incorporated herein by reference in their entirety: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Figure 2:
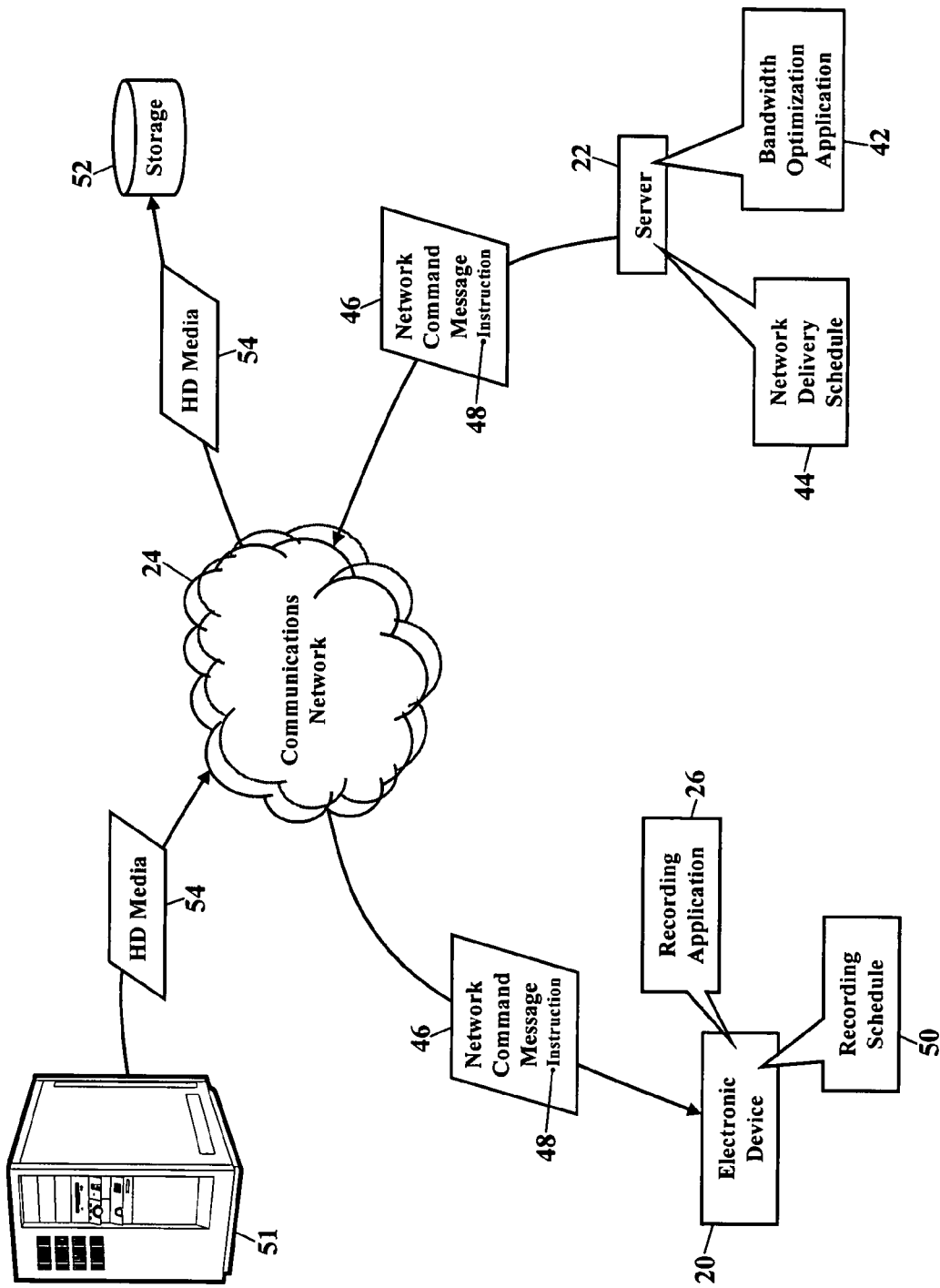
FIG. 2 is a schematic illustrating the storage of media to network memory, according to more exemplary embodiments.

FIG. 2 is a schematic illustrating the storage of media to network memory, according to more exemplary embodiments. Here the bandwidth optimization application 42 may instruct a media content server 51 to store movies, programming, music, and other media to a network storage device 52. Because media streams may be rescheduled for an alternative time of delivery and receipt (as FIG. 1 illustrated), a service, network, or content provider may store those media streams for later delivery. FIG. 2, for example, illustrates high definition ("HD") media 54 originating from the media content server 51. Because the HD media 54 may be bandwidth intensive, and/or because many customers will accept deferred delivery, the bandwidth optimization application 42 routes the HD media 54 to the network storage device 52. That is, all high-definition programming may be stored in the network storage device 52 for deferred delivery at later times. The HD media 54 is then delivered to those customers who desire immediate receipt of the HD media 54. If any customers have scheduled recording of the HD media 54, the bandwidth optimization application 42 may remove or pluck those destination addresses from the network delivery schedule 44. Those customers who wish to record the HD media 54 may have their delivery, and recording, deferred to a later date/time to conserve bandwidth. The provider thus receives, stores, and/or maintains electronic copies of the HD media 54, such that the deferred media may be retrieved and delivered at other times.

Reconfiguration may also occur at the customer's end. Because some customers have had their HD media 54 deferred to a later date/time for recording, each of the customer's electronic devices 20 may also need to be informed of that deferred delivery. According to exemplary embodiments, the bandwidth optimization application 42, then, causes the server 22 to send the network command message 46 to each of the customer's electronic devices 20. The network command message 46, as explained with reference to FIG. 1, may instruct each of the customer's electronic devices 20 to alter the recording of the HD media 54 to the deferred date/time. Each customer's electronic device 20 is reconfigured to receive and to record the deferred media. At the deferred time, then, one or more deferred streams of media originate from the network storage device 52. If the population of customers wishing to record the deferred media is large, then the bandwidth optimization application 42 may utilize multicast streaming technologies as a delivery mechanism. If, however, the population of customers is small, the bandwidth optimization application 42 may utilize unicast streaming or file transfer technologies. The network storage device 52 thus permits more efficient utilization of network bandwidth and more efficient delivery mechanisms.

FIG. 2 may be applied to any media. Although FIG. 2 is discussed with reference to high definition media, the network storage device 52 may store electronic copies of any media. The network storage device 52, for example, may receive and store electronic copies of standard definition formatted programming, music, and even data or information. Whatever the media, the network storage device 52 may maintain electronic copies of the media for deferred delivery.

Figure 3:
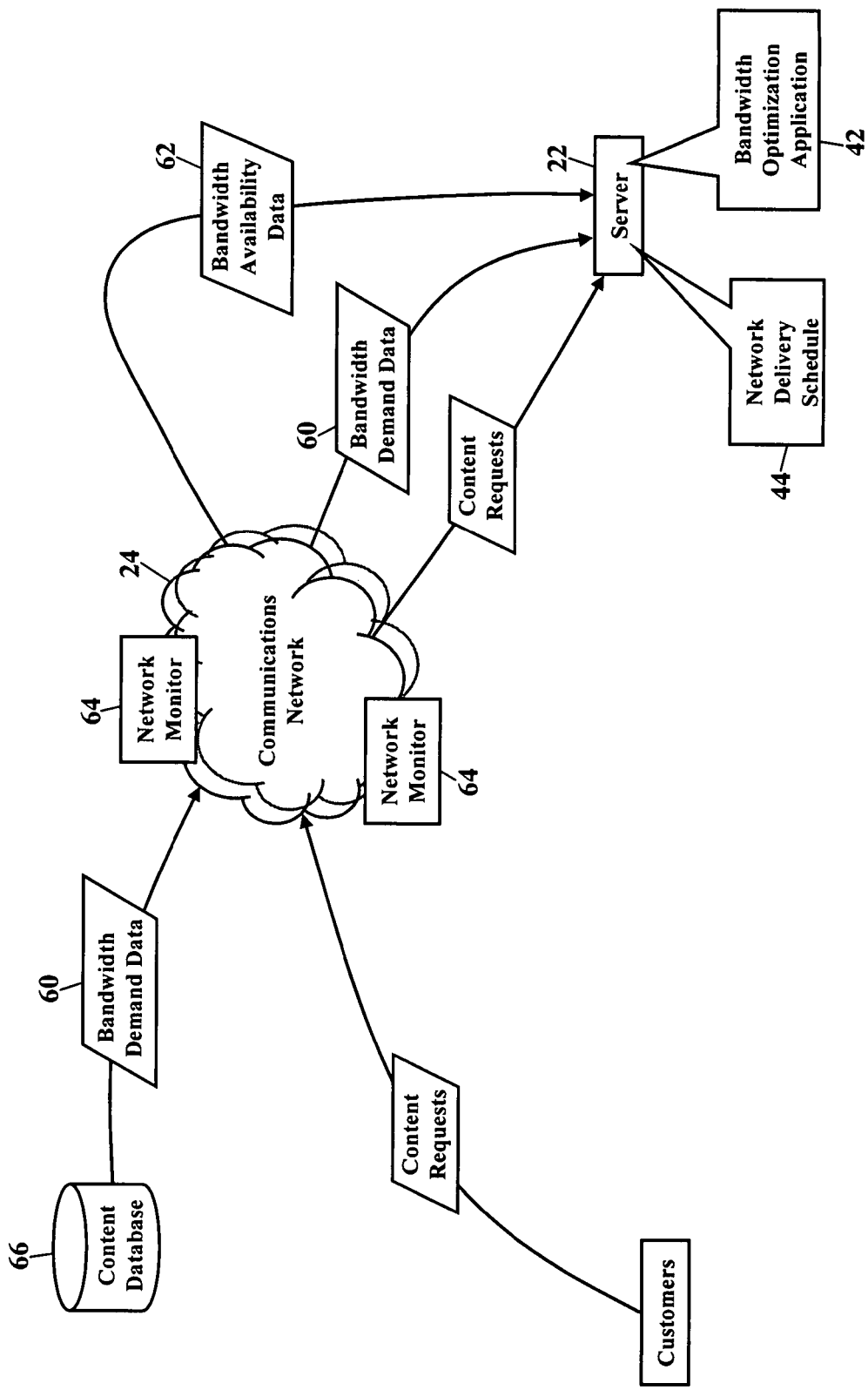
FIG. 3 is a schematic illustrating the monitoring of bandwidth demand and availability, according to yet more exemplary embodiments.

FIG. 3 is a schematic illustrating the monitoring of bandwidth demand and availability, according to yet more exemplary embodiments. Here the bandwidth optimization application 42 compares bandwidth demand to bandwidth availability. The bandwidth optimization application 42, for example, receives bandwidth demand data 60. The bandwidth optimization application 42 also receives bandwidth availability data 62. According to exemplary embodiments, the bandwidth demand data 60 is information representing the amount of bandwidth required to deliver the content requested by an individual customer and/or a population of customers. Each time a customer requests content, the bandwidth optimization application 42 retrieves, queries, or obtains for the bandwidth that is required to adequately deliver that requested content. According to exemplary embodiments, the bandwidth availability data 62 is information representing the amount of bandwidth that is instantaneously or nearly instantaneously available in the communications network 24. The bandwidth availability data 62 may indicate available bandwidth along an individual customer's "last mile" and/or along any link within the communications network 24. The bandwidth availability data 62, however, may represent available bandwidth in one or more links serving a population of customers or the available bandwidth in any portion of the communications network 24. The bandwidth availability data 62 is received from network monitors 64 operating throughout the communications network 24.

The bandwidth demand data 60 may be obtained from a content database 66. The content database 66 stores a listing of content and the minimum bandwidth that is necessary to adequately deliver the content (perhaps according to a quality of service or presentation requirement). The bandwidth demand data 60 may represent information for individual media titles, groupings of titles, or any combination of media information (e.g., black & white versions, audio-only media, HD/SD versions). The content database 66 may be locally or remotely located and responds to queries from the optimization application 42.

The bandwidth optimization application 42 may then make comparisons. The bandwidth optimization application 42 compares the available bandwidth to the demanded bandwidth. That is, the bandwidth optimization application 42 compares the bandwidth demand data 60 to the bandwidth availability data 62 for any link or portion of the communications network 24. When the available bandwidth is less than the bandwidth required to meet content demand, the bandwidth optimization application 42 may remove, pull out, terminate, or pluck streams that are being recorded or that are scheduled for recording. Those recorded streams may then be rescheduled for delivery at later times to conserve bandwidth.

Figure 4:
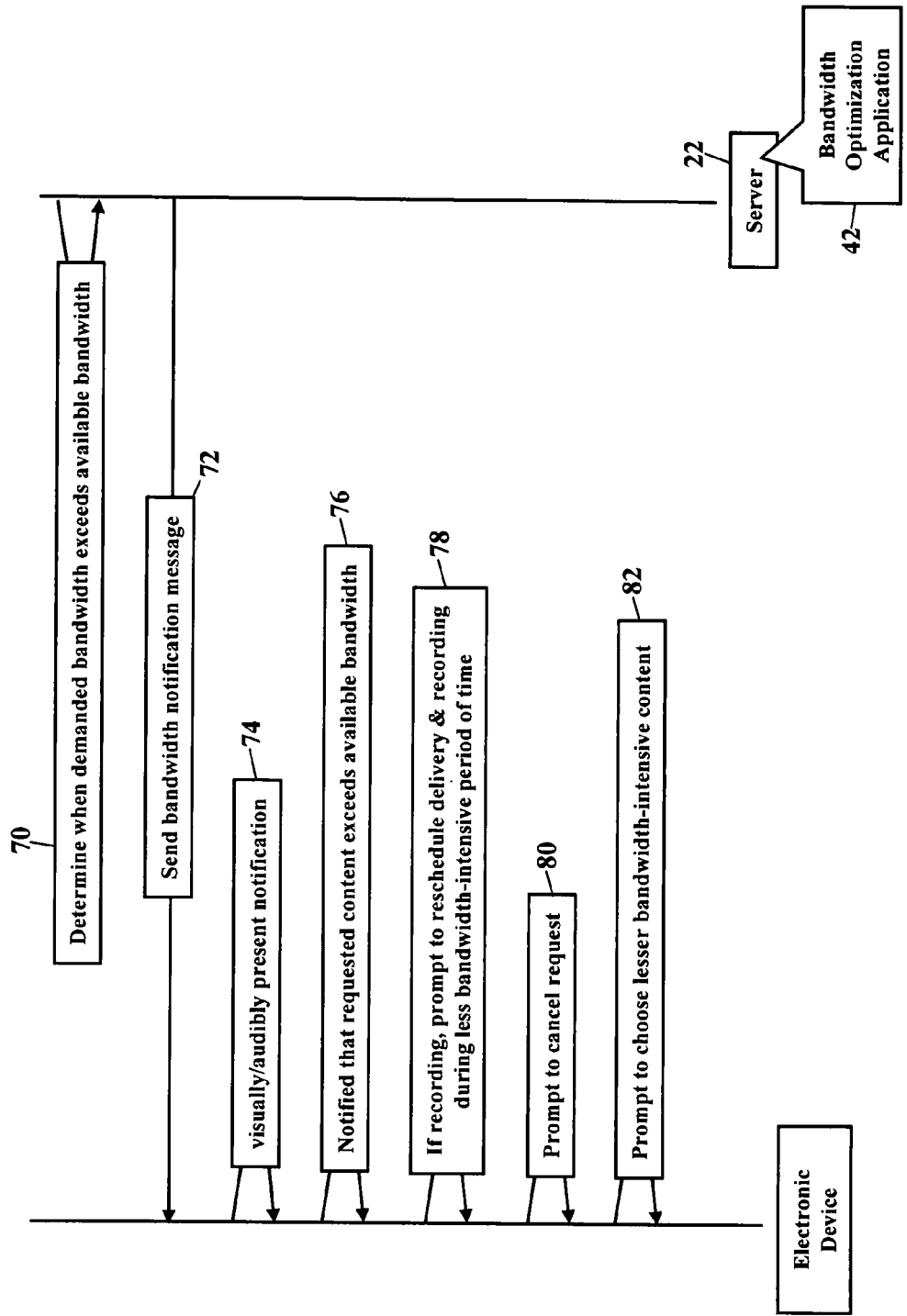
FIG. 4 is a schematic illustrating a process for customer resolution of bandwidth issues, according to still more exemplary embodiments.

FIG. 4 is a schematic illustrating a process for customer resolution of bandwidth issues, according to still more exemplary embodiments. The bandwidth optimization application 42, as earlier explained, determines when the demanded bandwidth exceeds the available bandwidth (Step 70). When the bandwidth optimization application 42 determines that a customer's demanded bandwidth exceeds their available bandwidth, the customer may be prompted to resolve the conflict. The bandwidth optimization application 42 sends a bandwidth notification message to the customer's electronic device 20 (Step 72). When the customer's electronic device 20 receives the bandwidth notification message, the bandwidth notification message causes the customer's electronic device 20 to visually and/or audibly present a notification (Step 74). The customer, for example, may be notified that their requested content exceeds the available bandwidth along any link in the communications network (Step 76). If the bandwidth optimization application 42 has determined that some of the customer's selected media will be, or is being, recorded, the customer may be prompted to reschedule that delivery and recording during a less bandwidth-intensive period of time (Step 78). The customer may additionally or alternatively be prompted to cancel their request (Step 80) and/or choose a lesser bandwidth-intensive content (Step 82). The customer, for example, may be prompted to accept a standard definition version or a non-colorized, back and white version.

Figure 5:
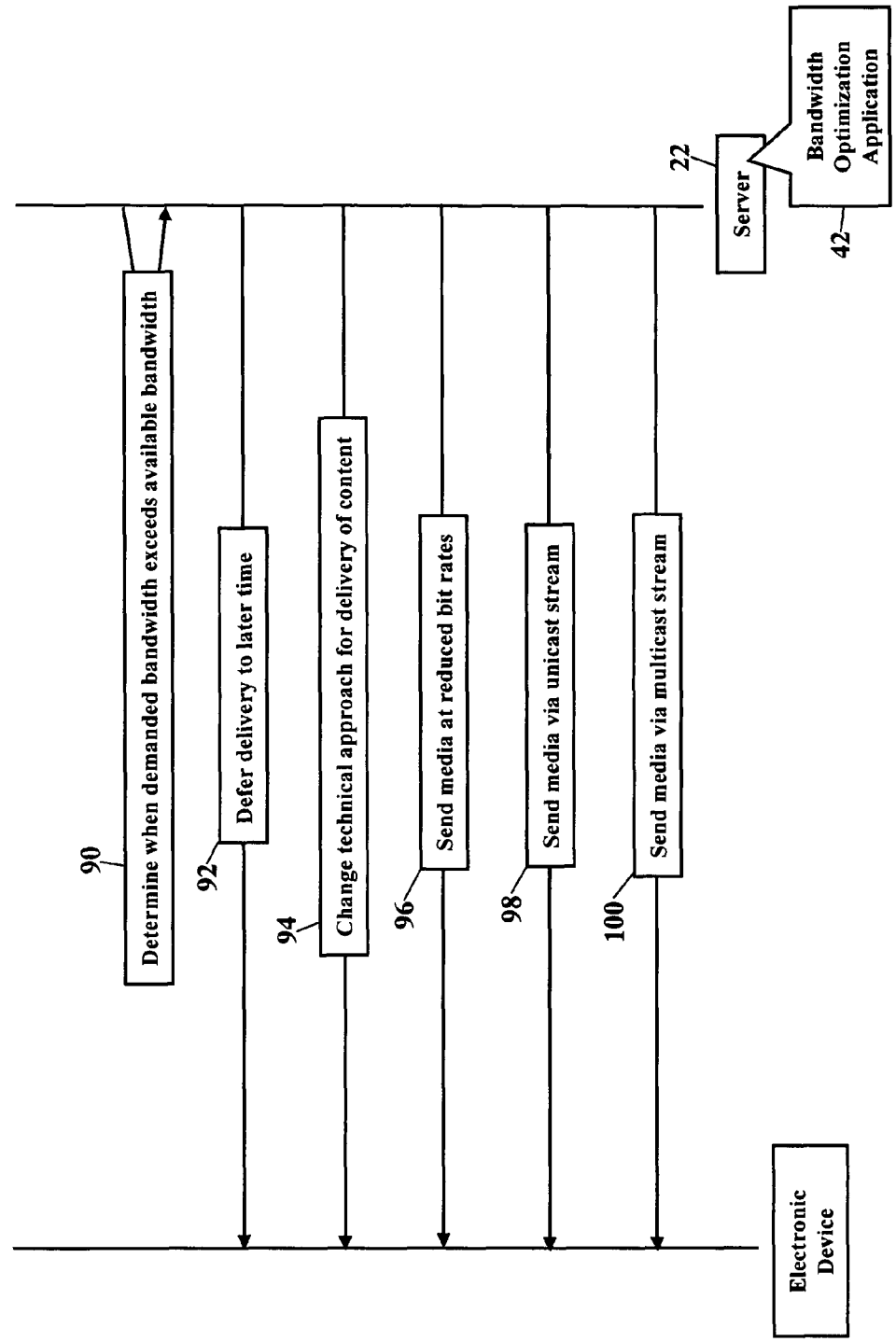
FIG. 5 is a schematic illustrating a process for selecting alternative methods of delivery, according to even more exemplary embodiments.

FIG. 5 is a schematic illustrating a process for selecting alternative methods of delivery, according to even more exemplary embodiments. When the bandwidth optimization application 42 determines that the required bandwidth exceeds the available bandwidth (Step 90), exemplary embodiments may establish alternative delivery schedules and/or delivery means for content. These alternative delivery schedules and or delivery means more efficiently utilize the available network bandwidth. The bandwidth optimization application 42 may defer delivery to later times (Step 92). The bandwidth optimization application 42, however, may additionally or alternatively change the technical approach for the delivery of content (Step 94). Any alternative delivery method may be selected to more efficiently utilize bandwidth, while still satisfying the customer's needs. The bandwidth optimization application 42, for example, may send media at reduced bit rates (e.g., bits per second or bytes per second) to conserve bandwidth (Step 96). The bandwidth optimization application 42 may send media at ¾, ½, ¼, or any other reduced bit rate that is feasible, available, and/or economical. When media is streamed at one-half the real-time bit rate, the required bandwidth is thus one-half the real-time bandwidth. The bandwidth optimization application 42 may additionally or alternatively unicast less popular media (Step 98), and one or more of those unicast streams may be at reduced bit rates. If media is popular, multicast streaming techniques may be used (Step 100), at full-speed or at slower rates, to more efficiently utilize bandwidth. Exemplary embodiments, then, may implement alternative methods of delivery that further efficiently utilize bandwidth.

Exemplary embodiments may also include one or more feedback loops. The customer may desire to receive and watch content while simultaneously recording different content. The prime time hours, for example, likely contain multiple content offerings that appeal to the customer. Again, when bandwidth is limited and/or the customer is recording media, the bandwidth optimization application 42 may defer delivery of the recorded media. The bandwidth optimization application 42 may send the bandwidth notification message to the customer's electronic device 20. The bandwidth notification message informs the customer that the media scheduled for recording will be deferred to a later time/date. Here, though, the customer is also informed of that deferred time or date. That is, the bandwidth optimization application 42 sends one or more messages that include information representing the time and/or date of deferred. delivery. Because the bandwidth optimization application 42 knows the rate at which the deferred media is sent, the bandwidth optimization application 42 may also calculate at what time the user may begin viewing the deferred media. That is, because the deferred media is streamed to the customer's electronic device 20, the customer need not wait until the streamed media is entirely recorded. At some point in the content delivery process the deferred media is available for enjoyment, even though the media has not been completely recorded. So, even though the media is deferred for later delivery, the customer may be told when the deferred media will be available for enjoyment.

A log may also be created. Because the bandwidth optimization application 42 may autonomously change a customer's recording schedules and defer delivery of the customer's selected media, the customer may have access to a media log. This media log provides a listing of each media stream received by the customer. Moreover, the media log indicates what media the customer has scheduled for recording and the date and time of each recorded media's scheduled "live" or initial broadcast. If the customer's recorded media has been deferred for delivery at a later time, then the media log may also indicate that deferred date and time. As the deferred media is being recorded, the media log may also provide a status, thus indicating how much of the media remains to be recorded (usually as a percentage of the total).

The media log may also inform the customer when viewing may begin, even though 100% of the media has not been recorded.

Figure 6:
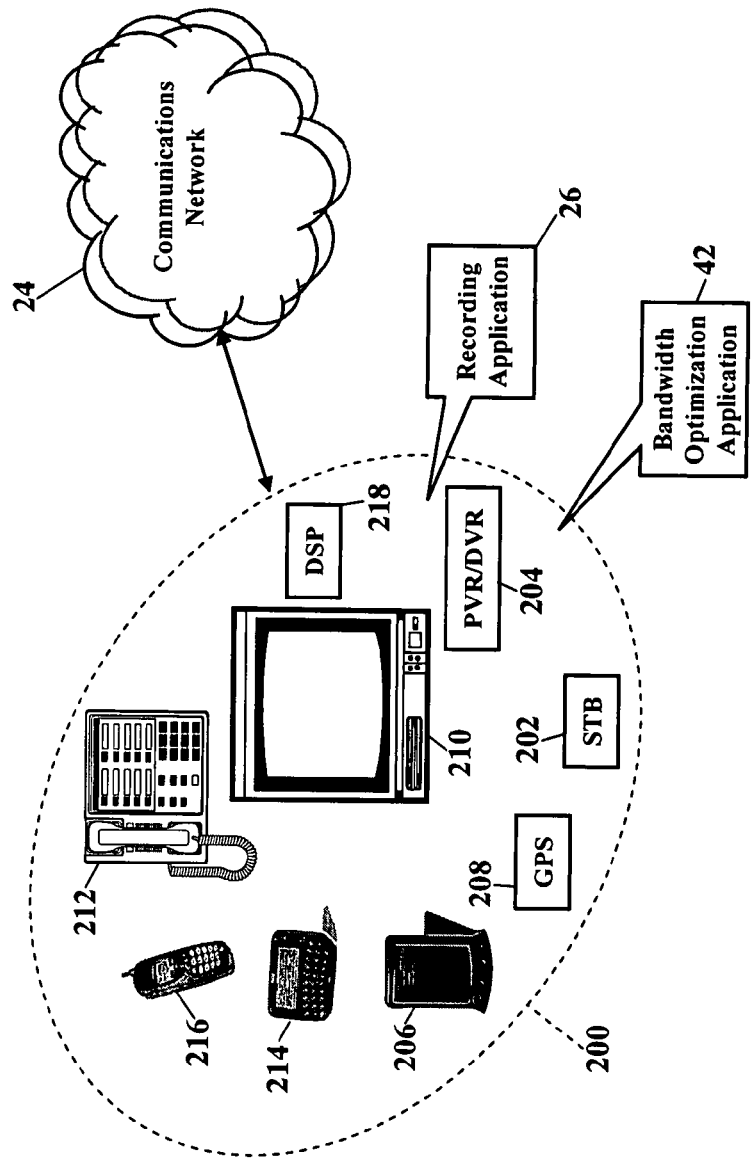
FIG. 6 depicts other possible operating environments, according to more exemplary embodiments.

FIG. 6 depicts other possible operating environments, according to more exemplary embodiments. FIG. 6 illustrates that the recording application 26 and/or the bandwidth optimization application 42 may alternatively or additionally operate within various other communications devices 200. FIG. 6, for example, illustrates that the recording application 26 and/or the bandwidth optimization application 42 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Additional exemplary embodiments may default to deferred delivery. Here, when the customer request media, or schedules the recording of media, exemplary embodiments may automatically and/or routinely defer delivery of the media to a period of lesser demand. Exemplary embodiments may, or may not, compare the available bandwidth to the demanded bandwidth. Whenever media content is requested, for whatever purpose, exemplary embodiments may defer delivery until a period of lesser demand. Delivery of the HD media (illustrated as reference numeral 54 in FIG. 2), for example, may be routinely deferred given its higher bandwidth requirement.

The exemplary embodiments may be applied regardless of networking environment. The customer's electronic device 20, and the server 22, may operate using wired or wireless principles. The communications network 24 may be a cable network operating in the radio-frequency domain and/or the Internet Protocol (IP) domain. The communications network 24 may have POTS components and/or features. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network or communications device, regardless of physical componentry, physical configuration, or communications standard(s).

The recording application 26 and/or the bandwidth optimization application 42 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000. This computer-readable medium, or media, could be distributed to end-subscribers, licensees, and assignees. These types of computer-readable media, and other types not mention here but considered within the scope of the exemplary embodiments, allow the recording application 26 and/or the bandwidth optimization application 42 to be easily disseminated. A computer program product comprises the recording application 26 and/or the bandwidth optimization application 42 stored on the computer-readable medium. The recording application 26 and/or the bandwidth optimization application 42 comprise computer-readable instructions/code for reducing bandwidth.

Exemplary embodiments may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method to conserve bandwidth, comprising:
   at a server, receiving a notification from a customer device that indicates media will be recorded;
   the server executing a bandwidth optimization application for comparing available bandwidth in a communications network serving a population of customers to required bandwidth to deliver the media to the customer device; and
   the server sending a network command message to the customer device when the required bandwidth exceeds the available bandwidth, the network command message providing an option to reschedule recording of the media to a period of lesser bandwidth demand in the communications network, the network command message further providing an option of selecting lesser bandwidth-intensive media for recording;
   wherein, when the option is selected for the lesser bandwidth-intensive media, the server delivers the media at a reduced bit rate that is a fraction of an original bit rate to conserve bandwidth;
   wherein, when the option is selected to reschedule recording of the media, the server stores the media in a network storage device as deferred media for deferred delivery at the period of lesser bandwidth demand, the server sending a notification message to the customer device, the notification message including a viewing time the user may begin viewing the deferred media in response to a rate at which the deferred media is sent, the viewing time being prior to complete delivery of the deferred media to the customer device.

2. The method according to claim 1, further comprising comparing a scheduled time of recording to periods of bandwidth demand.

3. The method according to claim 2, wherein when the scheduled time of recording coincides with a period of high bandwidth demand, then deferring delivery of the media to the period of lesser demand.

4. The method according to claim 1, further comprising adding an entry to a schedule to deliver the media at a later time.

5. The method according to claim 1, further comprising i) selecting a time of deferred delivery and ii) sending an instruction to the customer device to alter a customer recording schedule to record the media at the time selected by a provider.

6. A system for conserving bandwidth, comprising:
   a processor in a server communicating with memory, the memory storing processor-executable instructions for receiving a notification from a customer device that indicates media will be recorded;
   the processor executing a bandwidth optimization application for comparing available bandwidth in a communications network serving a population of customers to required bandwidth to deliver the media to the customer device; and
   the server sending a network command message to the customer device when the required bandwidth exceeds the available bandwidth, the network command message providing an option to reschedule recording of the media to a period of lesser bandwidth demand in the communications network, the network command message further providing an option of selecting lesser bandwidth-intensive media for recording;
   wherein, when the option is selected for the lesser bandwidth-intensive media, the server delivers the media at a reduced bit rate that is a fraction of an original bit rate to conserve bandwidth;
   wherein, when the option is selected to reschedule recording of the media, the server stores the media in a network storage device as deferred media for deferred delivery at the period of lesser bandwidth demand, the server sending a notification message to the customer device, the notification message including a viewing time the user may begin viewing the deferred media in response to a rate at which the deferred media is sent, the viewing time being prior to complete delivery of the deferred media to the customer device.

7. The system according to claim 6, the memory further storing instructions for comparing a scheduled time of recording to periods of bandwidth demand.

8. The system according to claim 7, the memory further storing instructions for when the scheduled time of recording coincides with a period of high bandwidth demand, then deferring delivery of the media to the period of lesser demand.

9. The system according to claim 6, the memory further storing instructions for adding an entry to a schedule to deliver the media at a later time.

10. The system according to claim 6, the memory further storing instructions for i) selecting a time of deferred delivery and ii) sending an instruction to the customer device to alter a customer recording schedule to record the media at the time selected by a provider.

11. A computer program product storing processor-executable instructions for:
   at a server, receiving a notification from a customer device that indicates media will be recorded;
   the server executing a bandwidth optimization application for comparing available bandwidth in a communications network serving a population of customers to required bandwidth to deliver the media to the customer device; and
   the server sending a network command message to the customer device when the required bandwidth exceeds the available bandwidth, the network command message providing an option to reschedule recording of the media to a period of lesser bandwidth demand in the communications network, the network command message further providing an option of selecting lesser bandwidth-intensive media for recording;
   wherein, when the option is selected for the lesser bandwidth-intensive media, the server delivers the media at a reduced bit rate that is a fraction of an original bit rate to conserve bandwidth;
   wherein, when the option is selected to reschedule recording of the media, the server stores the media in a network storage device as deferred media for deferred delivery at the period of lesser bandwidth demand, the server sending a notification message to the customer device, the notification message including a viewing time the user may begin viewing the deferred media in response to a rate at which the deferred media is sent, the viewing time being prior to complete delivery of the deferred media to the customer device.

12. A The computer program product according to claim 11, further comprising instructions for comparing a scheduled time of recording to periods of bandwidth demand.

13. The A computer program product according to claim 12, further comprising instructions for when the scheduled time of recording coincides with a period of high bandwidth demand, then deferring delivery of the media to the period of lesser demand.

14. The computer program product according to claim 11, further comprising instructions for adding an entry to a schedule to deliver the media at a later time.

15. The computer program product according to claim 11, further comprising instructions for i) selecting a time of deferred delivery and ii) sending an instruction to the customer device to alter a customer recording schedule to record the media at the time selected by a provider.

16. The method according to claim 1, wherein all high-definition programming is stored on the network storage device for deferred delivery at the period of lesser bandwidth demand.

* * * * *